United States Patent [19]

Grabowski et al.

[11] Patent Number: 5,100,843

[45] Date of Patent: Mar. 31, 1992

[54] OPTICAL GLASS WITH NEGATIVE ANOMALOUS PARTIAL DISPERSION

[75] Inventors: Danuta Grabowski, Taunusstein; Marc Clement; Volkmar Geiler, both of Mainz, all of Fed. Rep. of Germany

[73] Assignee: Schott Glaswerke, Mainz, Fed. Rep. of Germany

[21] Appl. No.: 530,597

[22] Filed: May 31, 1990

[30] Foreign Application Priority Data

May 31, 1989 [DE] Fed. Rep. of Germany ....... 3917614

[51] Int. Cl.$^5$ .................. C03C 3/072; C03C 3/074; C03C 4/00
[52] U.S. Cl. ........................ 501/75; 501/76; 501/903
[58] Field of Search ............... 501/75, 76, 903

[56] References Cited

U.S. PATENT DOCUMENTS

| | | | |
|---|---|---|---|
| 3,653,933 | 4/1972 | Tsunekawa | 501/75 |
| 4,390,638 | 6/1983 | Mennemann et al. | 501/75 |
| 4,721,690 | 1/1988 | Ross et al. | 501/903 |
| 4,824,809 | 4/1989 | Grabowski et al. | 501/75 |

FOREIGN PATENT DOCUMENTS

| | | |
|---|---|---|
| 121000A | 7/1964 | United Kingdom . |
| 1010475 | 11/1965 | United Kingdom . |
| 1181840A | 2/1970 | United Kingdom . |
| 1419644A | 12/1975 | United Kingdom . |

OTHER PUBLICATIONS

Chem. Abst. vol. 84, No. 22, May 31, 1976, p. 280; Abstract No. 1546 621z & JP-A-76 02717 (Tokunaga).
Izumitani, Optical Glass, New York 1986, pp. 156-157, plus data sheet ADC2 from Hoya Glass Catalog.
Glastechnische Berichte 45, Heft 1, pp. 1-9 (Jan. 1972).

*Primary Examiner*—Mark L. Bell
*Attorney, Agent, or Firm*—Millen, White & Zelano

[57] ABSTRACT

A glass having a negative anomalous partial dispersion $\Delta P_{g,F}$, an index of refraction of $n_d \geq 1.67$ and an Abbe number of $\nu_d > 36$ has the following composition, in % by weight, 3-11 of $SiO_2$, 0-3 of $GeO_2$, $\Sigma$ $SiO_2+GeO_2$, 4.5-11; $B_2O_3$, 29-35; 5-13 of $Al_2O_3$; 1-3 of $ZrO_2$; 0.2-3 of $TiO_2$; 0.2-1.5 of $Ta_2O_5$; 30-45 of PbO; 0-3 each of $Li_2O$, $Na_2O$, $K_2O$, $Rb_2O$, $Cs_2O$, $\Sigma$ alkali metal oxide 0-3; 0-3.5 each of MgO, CaO, BaO, SrO, $\Sigma$ alkaline-earth oxide 0-6, if $\Sigma$ $SiO_2$ and $GeO_2 \geq 9$; $\Sigma$ alkaline-earth oxide 0-3.5, if $\Sigma$ $SiO_2$ and $GeO_2 < 9$; 0-14 of ZnO, 0-3 of $La_2O_3$; 0-7 of $Nb_2O_3$; 0-1 of $Sb_2O_3$; 0-0.3 of $As_2O_3$; 0-1.5 of $WO_3$; 0-1 of F. This glass is inexpensive and can be produced in high quality, and has a high crystalization stability and good transmission values.

10 Claims, No Drawings

OPTICAL GLASS WITH NEGATIVE ANOMALOUS PARTIAL DISPERSION

BACKGROUND OF THE INVENTION

This invention relates to an optical glass having a negative anomalous partial dispersion $\Delta P_{g,F}$, an index of refraction of $n_d \geq 1.67$ and an Abbe number of $v_d > 36$.

As a measurement for the dispersion of an optical glass between wavelengths F ($\lambda = 486.13$ nm) and C ($\lambda = 656.27$ nm) the Abbe number $v_d$ is used, which is determined according to the equation $$v_d = \frac{n_d - 1}{n_F - n_C} \tag{1}$$

in which $n_d$, $n_F$ and $n_C$ represent the indices of refraction at wavelengths F, C and d ($\lambda = 587.56$ nm).

The relative partial dispersions are introduced for wavelength ranges outside of F and C. The relative partial dispersion $P_{x,y}$, relative to wavelengths x and y of the visible light, is given by:

$$P_{x,y} = \frac{n_x - n_y}{n_F - n_C} \tag{2}$$

Like the Abbe number, the relative partial dispersion is an important constant for an optical glass. The majority of optical glasses substantially satisfy the approximately linear relationship:

$$\bar{P}_{x,y} = a_{x,y} + b_{x,y} v_d, \tag{3}$$

which is established by two standard glasses, e.g., the two optical glasses F2 and K7 (SCHOTT-Katalog "Optisches Glas," Edition IX/80, section 2, pages 5-20). By combining glasses with different Abbe numbers, the chromatic aberration in the lens systems for two colors can be successfully eliminated. The remaining chromatic aberration continuing to exist for the other colors is designated as the secondary spectrum. But by the use of glasses with widely deviating partial dispersions, it is possible to reduce the secondary spectrum in lens systems correspondingly, thus substantially improving the correction of the lens system. For a number of years the producers of optical glasses have tried, in order to meet the requirements of manufacturers of optical equipment, to develop glasses that can be used to greatly reduce the secondary spectra of systems with the further objective of providing a correction in the blue region of the visible spectrum. In this region of the spectrum, the relative partial dispersion $P_{g,F}$ for the wavelengths g ($\lambda = 486.13$ nm) characterize the optical behavior of a glass.

In DE-OS 22 65 703, glasses are described having optical constants of 1.59 to 1.86 for $n_d$ and 62 to 19 for $v_d$, which glasses contain 2-50% by weight of highly expensive $Gd_2O_3$ and thus can be produced only at great cost. In DE-OS 22 62 364 glasses of a $B_2O_3$ - PbO - $Al_2O_3$ system are described, which because of the high $B_2O_3$ content have a low chemical resistance, a high density and a low devitrification stability (strong tendency toward crystallization). In DE-OS 19 44 284 and JP-OS 53-90311 (1978) glasses from the same system are described, in which by addition of $SiO_2$, an attempt was made to improve the chemical resistance, but this was satisfactory only with high $SiO_2$ contents. Furthermore, the high devitrification tendency remained unsatisfactory.

Boron silicate glasses containing zirconium are known from DE-OS 27 29 706, which glasses must contain at least 13.5% by weight of $ZrO_2$. It is known, however, that such high proportions of $ZrO_2$ promote the instability of the glass. Moreover, a high alkali content is necessary to achieve good meltability for such a glass, but the high alkali content adversely affects chemical resistance. Also, the high $ZrO_2$ proportion and the large amounts of the $Ta_2O_5$ added in almost all examples of this specification result in a high price of this glass. Similarly high costs are involved in the glasses described in DE-OS 20 24 912, which contain at least 10% by weight of $GeO_2$ and at least 20% by weight of $Ta_2O_5$.

In U.S. Pat. Nos. 2,762,713 and 4,211,569, glasses are described which have little or no $B_2O_3$, and part of the glasses contain high proportions of $SiO_2$, both of which conditions promote devitrification.

The glasses according to U.S. Pat. No. 3,888,692 contain less than 20% by weight of $B_2O_3$, at least 12.5% by weight of $SiO_2$ and at least 8% by weight of $Al_2O_3$. By exceeding this boric acid content, resistance to weathering decreases and devitrification occurs. The high $SiO_2$ content requires high melting temperatures and prolonged melting times, by which the attack on the melting vessel walls is accelerated.

Thus, despite many compositions taught by the prior art, all of them have at least one undesired characteristic.

SUMMARY OF THE INVENTION

An object of this invention therefore is to provide a glass having a negative anomalous partial dispersion, which can be produced inexpensively and easily, which has good reproducibility, which is crystallization stable and in which the Abbe number and refractive index can be varied within certain limits without the negative anomalous partial dispersion being lost.

Upon further study of the specification and appended claims, further objects and advantages of this invention will become apparent to those skilled in the art.

To achieve these objects, there is provided a glass containing, calculated on an oxide basis (in percent by weight) 3-11% of $SiO_2$, 0-3% of $GeO_2$, with the sum of $GeO_2$ and $SiO_2$ being 4.5 to 11%; 29-35% of $B_2O_3$; 5-13% of $Al_2O_3$; 1-3% of $ZrO_2$; 0.2-3% of $TiO_2$; 0.2-1.5% of $Ta_2O_5$; 30-45% of PbO; 0-3% each of the alkali metal oxides $Li_2O$, $Na_2O$, $K_2O$, $Rb_2O$, $Cs_2O$, with the sum of such alkali metal oxides being not more than 3%; 0-3.5% each of alkaline-earth oxides MgO, CaO, SrO, BaO, with the sum of said alkaline earth oxides not more than 6% if the sum of $SiO_2$ and $GeO_2$ is 9% or more, and no more than 3.5% if the sum of $SiO_2+GeO_2$ is less than 9%; 0-14% of ZnO; 0-3% of $La_2O_3$; 0-7% of $Nb_2O_3$; 0-1.5% of $WO_3$; 0-1% of $Sb_2O_3$; 0-0.3% of $As_2O_3$ and 0-1% of F.

The glasses according to the invention meet the objective for negative anomalous partial dispersions $\Delta P_{g,F}$ at indices of refraction of $n_d \geq 1.67$ and Abbe numbers $v_d > 36$, and the requirement for acceptable crystallization stabilities in conventional industrial glass melting processes. The high crystallization stability is achieved by the aforesaid proportions of $SiO_2$, $GeO_2$, $B_2O_3$, $Al_2O_3$ and PbO, especially preferred being (% by weight) 4.5-6 of $SiO_2$, 30-35 of $B_2O_3$, 10-13 of $Al_2O_3$ and 34-45 of PbO.

The content of $TiO_2$ of 0.2–3% by weight and $ZrO_2$ of 1–3% by weight serves to improve the chemical resistance of the glass. $ZrO_2$ even in small amounts improves the chemical resistance and moreover leads to a reduction in the viscosity of the glass without deleteriously affecting the devitrification behavior substantially. $TiO_2$ also increases chemical resistance, especially to attack by water and acids. An upper limit for the amount of $TiO_2$ is required inasmuch as with increasing $TiO_2$ content the devitrification tendency also increases. Therefore, in general, an upper limit of 3% by weight of $TiO_2$ should not be exceeded, and a content of 0.2–1% by weight of $TiO_2$ is preferred, since the latter range yields very good chemical resistance with good crystallization stability. Despite the small $TiO_2$ content, the resistance of the glass to acid attack is surprisingly good. Small additions of $WO_3$ of up to 1.5% by weight, especially of 0.2 to 1.5% by weight can reinforce the above-described effects even more.

The influence of $ZrO_2$, of $TiO_2$ and optionally of $WO_3$ on the chemical properties and crystallization stability is so high that a low $SiO_2$ content of 4.5–11, especially 4.5–6% by weight, can be used without the weather resistance of the glass suffering. The low $SiO_2$ content also provides a reduction in the melting temperature of the glass, which is significant principally because the severity of the attack by the glass melt on the wall of the melting vessel is reduced. The result of the reduction of this attack is an improved quality of the glass with a simultaneous reduction in the production costs. In addition, a low melting temperature brings with it lower energy costs.

Additions of the alkaline-earth oxides MgO, CaO, SrO, BaO of up to 3.5% by weight each as well as of ZnO of up to 14% by weight serve to permit variation of the $n_d$ and $v_d$ values, as well as for the improvement of the crystallization behavior. If the content of $SiO_2 + GeO_2$ is less than 9% by weight, a content of alkaline-earth oxides of a total of 3.5% by weight is generally not to be exceeded; if the content of $SiO_2 + GeO_2$ is 9% or more, the maximum permissible content of alkaline-earth oxides can generally be 6% by weight at most. Said contents of alkaline-earth oxides therefore are generally not to be exceeded, since this can lead to a positive relative partial dispersion. A content of alkaline-earth oxides of up to 1% by weight each as well as a total of u to 1% by weight is preferred. A ZnO content of up to 1% by weight is also preferred.

The alkali metal oxides $Li_2O$, $Na_2O$, $K_2O$, $Rb_2O$, $Cs_2O$ can be present in amounts of up to 3% by weight each, with the sum of such alkali metal oxides being not more than 3% by weight, to improve the meltability of the glass. By employing these amounts, the negative deviation of the relative partial dispersions is not substantially adversely affected. Exceeding the alkali metal content can lead to a loss of the negative partial dispersion. Thus, contents of alkali metal oxides of up to 1.5% by weight each, but a total of not more than 1.5% by weight, is preferred since within this range, the influence of the alkali metal content on the relative partial dispersion is relatively slight.

The content of $Ta_2O_3$ of 0.2–1.5% by weight is necessary to achieve a good negative partial dispersion. Because of the high price of $Ta_2O_3$ the content of 1.5% by weight should generally not be exceeded. $Nb_2O_3$ and $La_2O_3$ can be present in amounts of 0–7% by weight or 0–3% by weight, preferably 1–1.5% by weight or 0.5 to 1% by weight. They serve for the variation of the optical state of the glass. $GeO_2$ is a known equivalent of $SiO_2$ and can replace $SiO_2$ within certain limits. Because of its high cost, generally not more than 3% by weight of $GeO_2$ should be used. Preferably no $GeO_2$ at all is added.

As fining agents there can be introduced $As_2O_3$ in amounts of up to 0.3% by weight, $Sb_2O_3$ in amounts of up to 15 by weight and fluoride in amounts of up to 1% by weight in the form of compounds (e.g., as $BaF_2$, $LaF_3$, $BaSiF_6$) usual or necessary in glass engineering, without greatly changing the relative partial dispersion.

A particularly preferred glass has a composition, in % by weight, of: 4.5–6 of $SiO_2$; 0–3 of $GeO_2$; 30–35 of $B_2O_3$; 10–13 of $Al_2O_3$; 1–3 of $ZrO_2$; 0.2–1 of $TiO_2$; 0.2–1.5 of $Ta_2O_3$; 34–45 of PbO; 0–1 each of $Li_2O$, $K_2O$, $Rb_2O$, $Cs_2O$, 0–1.5 of $Na_2O$, with the sum of the alkali metal oxides being no more than 1.5% of alkali metal oxides; each of 0–1 of CaO, MgO, BaO, SrO, with the sum of alkaline earth metal oxides being not more than 1%; 0–1 of ZnO; 0.5–1 of $La_2O_3$; 1–1.5 of $Nb_2O_3$; 0.2–1.5 of $WO_3$; 0–1 of $Sb_2O_3$; 0–0.3 of $As_2O_3$; and 0–1 of F.

The glasses are largely free of expensive glass components so that the batch costs can be kept low. The low melting temperatures possible by the low $SiO_2$—(+optionally $GeO_2$) content lead to a further cost reduction and quality improvement, which together with good processability caused by the high crystallization stability leads to relatively inexpensive glass with exceptionally good optical properties.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

EXAMPLES

EXAMPLES 1–11

Calculated amounts of raw materials (oxides, carbonates, nitrates, fluorides, etc.) are weighed and mixed together in a conventional manner. The resulting glass batch is melted at about 1150° C. to 1180° C., then fined and homogenized. The finished melt is cast into a heated mold at about 990.C. The deviations of the composition of the finished glass in comparison with the composition calculated from the raw materials are generally under 10%, generally even below under 5%, depending on the production conditions.

The composition of the glasses and the optical properties are indicated in the table where the commas represent decimal points. $\tau i$ (440 nm/25 mm) indicates the internal transmittance of the glasses at a wavelength of 400 nm and a sample thickness of 25 mm.

The glass according to Example 3 was melted from the following ingredients: quartz powder, 5.11 kg; $H_3BO_3$, 57.90 kg; AlO(OH), 14.37 kg; $K_2CO_3$, 0.15 kg; $CaCO_3$, 0.18 kg; ZnO, 0.30 kg; $LaO_3$, 0.91 kg; $TiO_2$, 0.20 kg; $ZrO_2$, 1.10 kg; $Nb_2O_5$, 1.40 kg; $Ta_2O_5$, 1.1 kg; $WO_3$, 1.20 kg; $Pb_3O_4$, 44.95 kg; as fining agent 0.30 kg of $As_2O_3$ was used. The batch yields 100 kg of finished glass.

TABLE 1

| | Melt Examples (in % by weight) | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 9,05 | 9,50 | 5,10 | 5,10 | 10,00 | 10,20 | 7,80 | 6,00 | 4,50 | 5,00 | 3,00 |
| $B_2O_3$ | 30,40 | 30,00 | 32,60 | 32,60 | 29,00 | 29,20 | 31,20 | 32,00 | 34,50 | 33,00 | 34,50 |
| PbO | 31,00 | 30,80 | 43,90 | 43,90 | 30,70 | 33,80 | 33,50 | 32,80 | 44,50 | 44,00 | 44,50 |
| $Al_2O_3$ | 9,70 | 9,00 | 11,40 | 11,40 | 5,70 | 5,50 | 12,60 | 12,40 | 10,10 | 11,00 | 10,10 |
| $TiO_2$ | 2,30 | 2,30 | 0,20 | 0,50 | 2,30 | 2,00 | 1,00 | 0,80 | 0,50 | 0,70 | 0,50 |
| $ZrO_2$ | 2,50 | 2,50 | 1,10 | 1,10 | 2,50 | 2,30 | 2,90 | 2,50 | 1,00 | 1,40 | 1,00 |
| CaO | 3,30 | 2,50 | 0,10 | 0,10 | — | — | 3,30 | 3,30 | — | — | — |
| ZnO | — | — | 0,30 | 0,30 | 13,40 | 9,70 | — | 2,00 | 0,20 | 0,30 | 0,20 |
| BaO | — | 1,50 | — | — | — | — | — | — | — | — | — |
| SrO | — | — | — | — | 0,30 | — | — | — | — | — | — |
| MgO | — | 1,90 | — | — | — | — | — | — | — | — | — |
| $La_2O_3$ | 3,00 | 1,50 | 0,90 | 0,90 | 1,00 | 3,00 | — | — | 0,90 | 0,70 | 0,90 |
| $Nb_2O_5$ | 4,40 | 4,20 | 1,40 | 1,40 | 0,70 | — | 6,00 | 6,60 | 1,00 | 1,30 | 1,00 |
| $Ta_2O_5$ | 0,20 | 0,20 | 1,10 | 1,10 | 0,50 | 0,20 | 0,20 | 0,30 | 1,30 | 1,50 | 1,30 |
| $WO_3$ | — | — | 1,20 | 1,20 | 0,30 | — | — | — | 1,30 | 0,90 | 1,30 |
| $K_2O$ | 0,70 | 0,70 | 0,10 | 0,10 | 0,80 | 0,80 | 0,30 | 0,10 | — | — | — |
| $Na_2O$ | — | — | — | — | 1,30 | 1,50 | 0,50 | 0,20 | — | — | — |
| $Li_2O$ | 0,30 | 0,50 | — | — | 0,50 | 0,30 | 0,50 | 0,50 | — | — | — |
| $As_2O_3$ | 0,20 | 0,20 | 0,30 | 0,30 | 0,30 | 0,30 | 0,20 | 0,20 | 0,20 | 0,20 | 0,20 |
| $Sb_2O_3$ | — | — | — | — | — | — | — | 0,30 | — | — | — |
| $GeO_2$ | 2,50 | 2,70 | — | — | 0,70 | 1,10 | — | — | — | — | 1,50 |
| $F^-$ | — | — | — | — | — | — | — | 0,60 | — | — | — |
| nd | 1,6817 | 1,6815 | 1,6794 | 1,6824 | 1,6848 | 1,6865 | 1,6784 | 1,6840 | 1,6773 | 1,6721 | 1,6835 |
| vd | 37,07 | 37,27 | 37,60 | 37,19 | 37,86 | 38,00 | 37,10 | 37,36 | 37,63 | 37,51 | 37,30 |
| Pg,F | 0,5801 | 0,5801 | 0,5743 | 0,5758 | 0,5771 | 0,5771 | 0,5789 | 0,5783 | 0,5742 | 0,5753 | 0,5748 |
| Δ Pg,F | −0,0014 | −0,0010 | −0,0062 | −0,0054 | −0,0029 | −0,0027 | −0,0024 | −0,0026 | −0,0062 | −0,0053 | −0,0062 |
| τ i (400 nm/ 25 mm) | 0,79 | 0,80 | 0,82 | 0,89 | 0,75 | 0,74 | 0,82 | 0,83 | 0,86 | 0,80 | — |

The preceding examples can be repeated with similar success by substituting the generically or specifically described reactants and/or operating conditions of this invention for those used in the preceding examples.

In general, it is preferred that the negative value of the partial dispersion be at least as negative as −0.001 but even less negative values can be used and, depending, e.g., on the material of the other lenses. Normally, a value that is as negative as possible is especially preferred.

The invention includes lenses made from the glasses of the invention as well as lens systems comprising a plurality of lenses with at least one of the lenses having a positive value of partial dispersion and another of said lenses being a lens according to this invention having a negative anomalous partial dispersion.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Optical glass having a negative anomalous partial dispersion $\Delta P_{g,F}$, an index of refraction of $n_d \geq 1.67$, Abbe numbers of $v_d > 36$, and a composition, in % by weight of

| | | | |
|---|---|---|---|
| $SiO_2$ | 3–11 | ZnO | 0–14 |
| $GeO_2$ | 0–3 | $La_2O_3$ | 0–3 |
| Σ $SiO_2$ + $GeO_2$ | 4.5–11 | $Nb_2O_3$ | 0–7 |
| $B_2O_3$ | 29–35 | $Sb_2O_3$ | 0–1 |
| $Al_2O_3$ | 5–13 | $As_2O_3$ | 0–0.3 |
| $ZrO_2$ | 1–3 | $WO_3$ | 0–1.5 |
| TiO | 0.2–3 | | |
| $Ta_2O_5$ | 0.2–1.5 | | |
| PbO | 30–45 | | |
| $Li_2O$ | 0–3 | | |
| $Na_2O$ | 0–3 | | |
| $K_2O$ | 0–3 | | |
| $Rb_2O$ | 0–3 | | |
| $Cs_2O$ | 0–3 | | |
| Σ alkali metal oxides 0–3 | | | |
| MgO | 0–3.5 | | |
| CaO | 0–3.5 | | |
| BaO | 0–3.5 | | |
| SrO | 0–3.5 | | |

Σ alkaline-earth oxides 0–6 is $SiO_2$ + $GeO_2 \geq 9$
Σ alkaline-earth oxides 0–3.5 is $SiO_2$ + $GeO_2 < 9$.

2. Optical glass according to claim 1, wherein the content, in % by weight, of $SiO_2$ is 4.5–6; $B_2O_3$, 30–35; $Al_2O_3$, 10–13; and PbO, 34–45.

3. Optical glass according to claim 2, wherein the content, in % by weight, of ZnO is 0–1.

4. Optical glass according to claim 1, of the following composition, in % by weight:

| | |
|---|---|
| $SiO_2$ | 4.5–6 |
| $GeO_2$ | 0–3 |
| $B_2O_3$ | 30–35 |
| $Al_2O_3$ | 10–13 |
| $ZrO_2$ | 1–3 |
| $TiO_2$ | 0.2–1 |
| $Ta_2O_5$ | 0.2–1.5 |
| PbO | 34–45 |
| $Li_2O$ | 0–1 |
| $Na_2O$ | 0–1.5 |
| $K_2O$ | 0–1 |
| $Rb_2O$ | 0–1 |
| $Cs_2O$ | 0–1 |
| Σ alkali metal oxide | 0–1.5 |
| CaO | 0–1 |
| MgO | 0–1 |
| BaO | 0–1 |
| SrO | 0–1 |
| Σ alkaline-earth oxide | 0–1 |
| ZnO | 0–1 |
| $La_2O_3$ | 0.5–1 |
| $Nb_2O_3$ | 1–1.5 |
| $Sb_2O_3$ | 0–1 |
| $As_2O_3$ | 0–0.3 |
| $WO_3$ | 0.2–1.5 |
| $F^-$ | 0–1. |

5. A glass according to claim 4, having no $GeO_2$.
6. A lens made from the optical glass of claim 1.
7. A lens made from the optical glass of claim 2.
8. A lens made from the optical glass of claim 3.
9. A lens made from the optical glass of claim 4.
10. A lens made from the optical glass of claim 5.

* * * * *